United States Patent Office 3,816,476
Patented June 11, 1974

3,816,476
ADDITION REACTION INVOLVING DIPEROXY-FUMARATE AND COMPOUNDS HAVING DI-PEROXYSUCCINYL GROUPS
Richard Anthony Bafford, 456 Forbes Ave., Tonawanda, N.Y. 14151; Ernest Rudolph Kamens, 52 Rano St., Buffalo, N.Y. 14207; and Orville Leonard Mageli, 81 Danbury Lane, Kenmore, N.Y. 14217,
No Drawing. Original application Ser. No. 711,502, Mar. 8, 1968, now Patent No. 3,592,948. Divided and this application Apr. 2, 1971, Ser. No. 134,098
Int. Cl. C07d 5/04
U.S. Cl. 260—347.5
14 Claims

ABSTRACT OF THE DISCLOSURE

A diester of diperoxyfumaric acid is reacted at its double bond with an organic compound R—(X)$_s$ where "X" is a monovalent atom readily abstractable by a free radical, e.g., hydrogen, chlorine or bromine, and R is inert to the peroxycarbonyl groups of the diperoxyfumarate to form an addition product including at least one diester of a substituted diperoxysuccinic acid. For example: Tetrahydrofuran and di-t-butyl diperoxyfumarate react at about 0° C. to form di-t-butyl alpha-(2-tetrahydrofuryl) diperoxysuccinate. Polyglycols and polyvinyl ethers, alcohols, halides, etc. react to give polymers having pendant pairs of peroxycarbonyl ester groups in gamma relationship to each other.

These compounds are of especial interest in the preparation of block and graft copolymers.

CROSS-REFERENCE TO RELATED APPLICATION

This application is a division of copending application Ser. No. 711,502, filed Mar. 8, 1968, now U.S. Pat. No. 3,592,948.

BACKGROUND OF THE INVENTION

1. Field of the invention

This invention relates to diesters of substituted diperoxysuccinic acid, which may be simple molecular compounds or polymeric compounds having one or more pendant "diperoxysuccinyl" groups. Also the invention relates to methods of preparing these compounds.

2. Description of the prior art

We know of no reported work on the addition reactions of unsaturated peroxyesters.

Free radical additions to olefins to form carbon-carbon bonds are known. *Organic Reactions*, Volume XIII, devotes two chapters to such additions. It is known that simple maleate esters and simple fumarate esters will undergo such addition reactions to some extent; however, the fumarates undergo this addition reaction far less readily than do the maleate esters. Thus, *Organic Reactions* gives 39 examples of maleate ester additions and only 3 examples of fumarate ester additions.

Patrick, *J. Org. Chem.*, 17, 1009 (1952) reports a 76% yield of alpha-butyryl succinic ester from the addition of n-butyraldehyde to diethyl maleate; and a 26% yield of alpha-butyryl succinic ester from the addition of n-butyraldehyde to diethyl fumarate.

Jacobs and Ecke, *J. Org. Chem.*, 28, 3036 (1963) report a 27% yield of addition product of tetrahydrofuran (THF) and diethyl maleate. Maleic anhydride and tetrahydrofuran added at a yield of 61% and 70%. In all these experiments the temperature was held at the reflux temperature of the THF [about 65° C.]. Also, they state the reaction is specific to five membered cyclic ethers.

We obtained at the Jacobs and Ecke conditions a 39% yield of the addition product of diethyl maleate and tetrahydrofuran and a 14% yield of the addition product of diethyl fumarate and tetrahydrofuran.

SUMMARY OF THE INVENTION

We have discovered that diesters of diperoxyfumaric acid react with (add to) a great many organic compounds (the more common compounds are simple "inert" solvents, such as, alcohols and ethers) when the materials are mixed. The reaction is exothermic and the temperature must be controlled to avoid substantial decomposition of the addition product. (Pure d-t-butyl diperoxy fumarate is indefinitely stable at room temperature, about 25° C.)

This addition reaction is completely unexpected because the simple fumarate esters are rather inert to free radical addition and even under vigorous conditions give poor yield of the addition product (sometmes called "adducts"). Even more surprising is the fact that the diesters of diperoxyfumarate add more easily and give almost quantitative yields as compared to maleic anhydride, hitherto considered a very reactive compound in free radical addition reactions.

To illustrate: Maleic anhydride and THF, at reflux temperature, and sunlamp irradiation, gave a 61% yield of product in 6 hours (Jacobs and Ecke). Di-t-butyl diperoxyfumarate and THF, at 0° C. and sunlamp irradiation, gave a yield of 94% of product in 6 hours.

The process of the invention makes a compound having (including) at least one pair of peroxycarbonyl ester groups in gamma relationship to each other by saturating the double bond of a diester of diperoxyfumaric acid, under controlled conditions of temperature below about +30° C., by means of an organic compound R—(X)$_s$ where (—X) is present in excess of the stoichiometric requirement for saturation of said fumaric acid, to obtain a product including at least one diester of a substituted diperoxysuccinic acid, where: (a) each of said ester groups is alkyl, cycloalkyl or aralkyl; and (b) R—(X)$_s$ is an organic compound having a monovalent atom "—X" readily abstractable by a free radical, "R" is inert to the peroxycarbonyl groups in said diperoxyfumaric acid diester, and "s" is equal to at least 1. Desirably the C—X bond of compound R—(X)$_s$ is characterized by a bond energy of not more than about 80 kcal. per mole.

Particularly suitable R—(X)$_s$ compounds fall in the classes of alcohols, ethers, aldehydes, formate esters, carboxylic acids, mercaptans, orthoesters, acetals, halohydrocarbons, hydrocarbon substituted silanes, and hydrocarbon substituted phosphines.

The compound of the invention has the formula

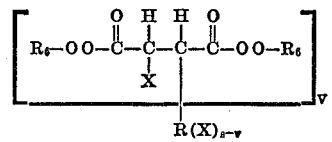

where (1) R$_6$ is alkyl, cycloalkyl or aralkyl; (2) R and X are derived from an organic compound R—(X)$_s$, "X" is a monovalent atom readily abstractable by a free radical, "R" is inert to a peroxycarbonyl group and "s" is equal to at least 1; and (3) "v" is equal to at least 1 and is not greater than "s." Illustrative compounds are: di-t-butyl alpha-(2-tetrahydrofuryl) diperoxysuccinate; t-butyl 3-(t-butylperoxycarbonyl)-4-methyl-4-isopropoxy peroxyvalerate; the addition product of equal moles of polyethylene glycol and di-t-butyl diperoxyfumarate; di-t-butyl alpha-(methoxycarbonyl) diperoxysuccinate; and di-t-butyl alpha-(N,N-dimethylformamido)diperoxysuccinate.

DESCRIPTION OF THE INVENTION AND WORKING EXAMPLES

This invention affords a surprisingly simple process by which a wide variety of relatively complex organic peroxyesters hitherto unobtainable can be prepared in good to excellent yields.

The process comprises adding, desirably, a solution of diester of diperoxyfumaric acid in a saturated hydrocarbon, such as pentane, or other inert solvent, to an excess, desirably from a 2 to 1 to 20 to 1 molar ratio of substrate, R—(X)$_s$, to fumarate, preferably about 10 to 1, while vigorous agitation is provided and the reaction temperature is maintained at below about +30°, commonly —20° to +30° C., preferably at 0° to 5° C.

The reaction may be irradiated with a sun lamp but this is not necessary in most cases. Catalysts such as diisobutyryl peroxide, diisopropyl peroxydicarbonate or acetyl cyclohexanesulfonyl peroxide may be used in place of or in addition to a sun lamp.

The peroxyfumarate (solution) is preferably added slowly over a period of time, for example: over a 4–6 hr. period or even longer. It can be added all at once if the reaction zone temperature is controlled at the desired level.

The reaction mixture is stirred for a time, for example: 1 to 2 hours, after completion of the addition of the peroxyfumarate, then the excess substrate is removed by suitable means, such as vacuum, stripping, fractional distillation or selective extraction. The addition product is usually substantially pure but may be further purified by crystallization or the like methods.

Useful substrate, R—(X)$_s$ is any compound having a monovalent atom, —X, readily abstractable by a free radical. R is inert to a peroxycarbonyl group under reaction conditions. The most common abstractable atom X, is a hydrogen atom but other atoms, such as chlorine and bromine, can be abstractable. In general, it may be said that any compound, R—(X)$_s$ where the bond energy of the C—X bond is not more than about 80 kcal. per mole will be an effective substrate for addition to the double bond of the diperoxyfumarate.

Some illustrations of typical R—(X)$_s$ compounds having a suitable bond energy are given in Table A.

TABLE A

| R—X | | Bond energy, kcal./mole |
|---|---|---|
| a | $CH_3\overset{O}{\overset{\|}{C}}{-}H$ | 78 |
| b | $HO\overset{\|}{\underset{\|}{C}}{-}H$ | 76 |
| c | $CH_3O\overset{\|}{\underset{\|}{C}}{-}H$ | 76 |
| d | $C_3H_7S{-}H$ | 80 |
| e | $Cl_3C{-}Cl$ | 68 |
| f | $Cl_3C{-}Br$ | 49 |
| g | $(CH_3)_3Si{-}H$ | 76 |
| h | $(CH_3)_2P{-}H$ | 77 |

Other factors must be considered such as stabilization of the radial R· by resonance or hyperconjugation and diffusion of the electron charge over a large atom such as sulfur or phosphorus.

Various classes of compounds R—(X)$_s$ which are useful, R—(X)$_s$ is not limited to these, in the process of the invention are:

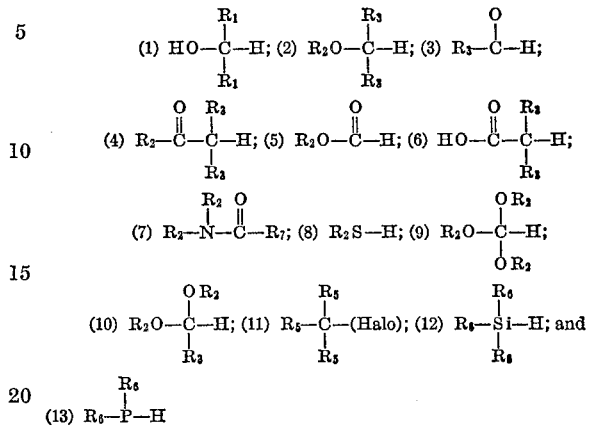

(13) $R_6{-}\overset{R_6}{\underset{\|}{P}}{-}H$

(14) molecular arrangements of one or more radicals derived from (1)–(13), said molecules being characterized by the presence of a plurality of (X) atoms, where:

(a) $R_1$ is hydrogen, alkyl, cycloalkyl or aralkyl, each having 1–12 carbon atoms;
(b) $R_1$—C—$R_1$ may form a homocyclic group;
(c) $R_2$ is alkyl, cycloalkyl, aralkyl or aryl;
(d) $R_3$ is hydrogen, alkyl, cycloalkyl, aralky or aryl;
(e) $R_2$—O—$CR_3$ may form a heterocyclic group;
(f) $R_3$—C—$R_3$ may form a homocyclic group;
(g) $R_2$—O—C—$OR_2$ may form a heterocyclic group;
(h) $R_5$ is alkyl, cycloalkyl, aralkyl or halo;
(i) Halo is chloro or bromo;
(j) $R_6$ is alkyl, cycloalkyl or aralkyl;
(k) $R_7$ is hydrogen or —C($R_3$)$_2$—H; and
(m) in (1) not more than one $R_1$ is hydrogen.

The substrate, R—(X)$_s$, is further illustrated:

(1) ALCOHOLS

Any primary or secondary alcohol, i.e., not more than one $R_1$ can be hydrogen, of the defined classes. For example: ethanol, isopropanol, cyclohexanol, and alpha-phenethyl alcohol. Molecular arrangement (12) includes simple diols, triols, etc. having two or more hydroxyl groups, such as hexandiol, glycerol and cyclohexandiol.

(2) ETHERS $R_2$ is alkyl, cycloalkyl, aralkyl or aryl; $R_3$ is alkyl, cycloalkyl or aralkyl, $R_2OCR_3$ may form a heterocyclic system such as tetrahydrofuryl, tetrahydropyranyl; $R_3$—C—$R_3$ may form a homocyclic group such as cyclohexyl, cyclopentyl. Illustrations: diisopropyl ether, phenyl isopropyl ether, t-butyl isopropyl ether, diethyl ether, methyl cyclohexyl ether, tetrahydrofuran, 2-methyltetrahydrofuran, poly-ethers such as polyethylene glycols, polypropylene glycols, Carbowaxes and Carbitols, and simple ether glycols such as diethylene glycol.

(3) ALDEHYDES

Illustrations: benzaldehyde, acetaldehyde, formaldehyde, cyclohexanecarboxaldehyde, pivalaldehyde, butyraldehyde, hydrocinnamaldehyde.

(4) KETONES

Illustrations: Acetone, di-n-amyl ketone, methyl ethyl ketone, methyl cyclopropyl ketone, phenyl isopropyl ketone.

(5) FORMATE ESTERS

Illustration: Methyl formate, benzyl formate, phenyl formate, and cyclopentyl formate.

(6) CARBOXYLIC ACIDS

It is preferred that only one $R_3$ be hydrogen. Any acid coming within this class can be used. Simple polycarboxylic acids come within class (12).

(7) SUBSTITUTED AMIDES

Illustrations: N,N-dimethyl formamide; N,N-dimethylisobutyramide, N,N-diethyl formamide.

(8) MERCAPTANS

Illustrations: Propanethiol, thiophenol, cyclohexanethiol and alpha-mercaptoethylbenzene. Polymercaptans corresponding to glycols, ether glycols, and polyglycols come within class (12).

(9) ORTHOESTERS

Illustrations: trimethyl orthoformate, triphenyl orthoformate, tricyclohexyl orthoformate, triisobutyl orthoformate.

(10) ACETALS $R_2$ is alkyl, cycloalkyl, aryl or aralkyl; $R_3$ is $R_2$ or hydrogen; $(R_2O)_2C$ can be part of a heterocyclic system such as 1,3 dioxolanyl. For example: benzaldehyde-dimethylacetal, 2-phenyl-1,3-dioxolane, butyraldehyde-diethyl acetal.

(11) HALOHYDROCARBONS

"Halo" here means chloro or bromo and includes all those well known members of this class especially the halomethanes, haloethanes, halocyclohexanes, phenyl(chloro)ethane. The chloro methanes and chloroethanes are preferred; however the halowaxes are especially of interest when a long chain having many pendant diperoxysuccinyl groups are desired.

(12) HYDROCARBON SUBSTITUTED SILANES

Illustrations: trimethyl silane, tribenzoyl silane, tricyclohexyl silane, tri-t-butylsilane.

(13) HYDROCARBON SUBSTITUTED PHOSPHINES

Illustrations: Dimethyl phosphine, di-n-propyl phosphine, di-benzyl phosphine, dicyclohexyl phosphine.

(14) MOLECULAR ARRANGEMENTS

In addition to the simple polyfunctional molecules mentioned in connection with 1–13 above, the invention contemplates as substrates polymers and copolymers containing the above or other functional groups either in the polymer backbone or as pendant groups. Such addition products are useful for the preparation of block and graft polymers and in polymer laminates where the pendant diperoxy succinyl groups act as bonding sites between the polymer interfaces.

Illustrative polymer substrates include polymers and copolymers of polyvinyl esters, polyacetals, polyethylene glycols, polypropylene glycols, polyvinyl alcohols, polymethacrylic acids and polyesters of diols and dicarboxylic acids.

Substrates containing two or more abstractable hydrogens may be used but can lead to complex mixtures which will be difficult to purify.

Substrates containing olefinic unsaturations desirably should be avoided since radical reactions will occur at these double bonds to produce byproducts, which may or may not be desirable.

FURTHER ILLUSTRATIVE MATERIAL

In order to show the wide variety of diperoxysuccinyl group containing simple compounds which can be made by the process of the invention certain of the above classes are further illustrated by compounds, giving a name and the structure dedeuced by us, using in each instance as one reactant, di-t-butyl-diperoxyfumarate—hereinafter designated as DBDPF.

RADICAL CONTAINED BY THE DI(PEROXY-ESTER

1. Hydroxyl: Isopropanol and DBDPF.

Name: t-Butyl gamma-hydroxy-gamma-methyl-beta-(t-butylperoxycarbonyl)peroxyvalerate Formula:

$$\text{HOC}(CH_3)(CH_3)-\overset{H}{\underset{|}{C}}-\overset{O}{\underset{}{C}}-OOC(CH_3)_3$$
$$\phantom{HOC(CH_3)(CH_3)-}H_2C-\overset{O}{\underset{}{C}}-OOC(CH_3)_3$$

2. Alkoxy: Tetrahydrofuran and DBDPF.

Di-t-butyl alpha-(2-tetrahydrofuryl)diperoxysuccinate

3. Beta-carbonyl: n-butyraldehyde and DBDPF.

Di-t-butyl, alpha-butyryldiperoxysuccinate $$CH_3CH_2CH_2\overset{O}{\underset{}{C}}-\overset{H}{\underset{|}{C}}-\overset{O}{\underset{}{C}}-OO-(t\text{-Bu})$$
$$\phantom{CH_3CH_2CH_2}H_2C-\overset{O}{\underset{}{C}}-OO-(t\text{-Bu})$$

4. Gamma-carbonyl: Methyl isopropyl ketone and DBDPF.

t-Butyl 3-(t-butylperoxycarbonyl)-4,4-dimethyl-5-oxoperoxyhexanoate

5. Carbalkoxy: Methyl formate and DBDPF.

Di-t-butyl alpha-(methoxycarbonyl)diperoxysuccinate $$CH_3O\overset{O}{\underset{}{C}}-\overset{H}{\underset{|}{C}}-\overset{O}{\underset{}{C}}-OO-(t\text{-Bu})$$
$$\phantom{CH_3OC}H_2C-\overset{O}{\underset{}{C}}-OO-(t\text{-Bu})$$

6. Carboxyl: Isobutyric acid and DBDPF.

t-Butyl gamma-carboxy-gamma-methyl-β-(t-butylperoxycarbonyl)peroxyvalerate

7. Amido: N,N'-dimethyl formamide and DBDPF.

8. Thiaalkyl: n-propyl mercaptan and DBDPF.

Di-*t*-butyl alpha-(1-thiabutyl)diperoxysuccinate

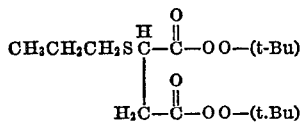

9. Orthoester: Trimethylorthoformate and DBDPF.

Di-*t*-butyl alpha-(trimethoxymethyl)diperoxysuccinate

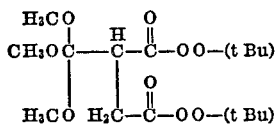

ADDITIONAL DEFINITIONS

Alkyl: Except where noted otherwise, each alkyl group may include 1 or more carbon atoms. Desirably each has 1–22 carbon atoms. Preferably each has 1–12 carbon atoms.

Cycloalkyl: May be single ring or have two or more fused rings. Desirably the single ring has in the ring 3–12 carbon atoms, and preferably 5–8 carbon atoms. Preferably the total number of carbon atoms in the radical is 5–12.

Aryl: May be a single benzene ring, or a doubled or higher system, e.g. biphenyl, terphenyl, quaternapthalene, or a fused benzene ring system, e.g. naphthalene, anthracene, phenathrene, or an alkane bridged system, e.g., biphenylmethane, biphenylpropane. Phenyl, biphenyl, naphthalyl and the alkyl substituted radicals are preferred.

Aralkyl: The "Ar" portion of the radical may be as in "Aryl." The "alkyl" portion has desirably 1–12 carbon atoms and preferably 1–6 carbon atoms.

R–(X)$_s$: R is any organic radical, preferably free of ethylene unsaturation, inert to peroxycarbonyl groups and having valence bonds equal to "s." X is a monovalent atom readily abstractable, under these reaction conditions, by a free radical. "s" may be an integer from 1 to about 500, depending on the type of diperoxysuccinyl compound desired and also the amount of active oxygen to be present in the particular product.

UTILITY

As already mentioned the polymeric products of the invention are useful in graft and block copolymers preparation. All of the products of the invention are useful as free radical initiators in the same manner as other peroxyesters and peroxides, for example, in vinyl polymerization and the curing of unsaturated polyester resins and elastomers.

EXAMPLES OF THE INVENTION AND UTILITY

Example 1.—The spontaneous decomposition of di-*t*-butyl diperoxyfumarate in diethyl ether A 250 ml. flask was equipped with a reflux condenser, thermometer and magnetic stirring bar. The flask was surrounded by an ice bath and to the flask was charged 13.0 g. (0.05 mole) of di-*t*-butyl diperoxyfumarate and 37 g. (0.5 mole) of diethyl ether. When the fumarate ester had dissolved completely, the ice bath was removed and the solution allowed to warm up. The mixture spontaneously warmed up to about 35° and the ether gently refluxed. The mixture was stirred at ambient temperature for sixteen hours.

The ether was removed in vacuo leaving 14.4 g. of a pale yellow viscous oil. The oil was dissolved in a small amount of pentane cooled to −10° and seeded with crystals of di-*t*- butyl diperoxyfumarate but there was no crystallization (Pentane is the preferred solvent for the recrystallization of di-t-butyl diperoxyfumarate). The pentane was then stripped off in vacuo and the residue was analyzed for "active oxygen" (the peroxidic oxygen content). The oil contained 7.00% "active oxygen." The fumarate is 12.6%. Therefore it was calculated that 37% of the initial active oxygen content had been lost.

The peroxidic oil (11 g.) was redissolved in 200 ml. of diethyl ether and stirred at ambient temperature for 24 hours. The ether was removed in vacuo as before leaving 10 g. of yellow oil. The oil was analyzed and was found not to have lost any further "active oxygen."

Thus it is apparent that the peroxidic oil was not impure di-*t*-butyl diperoxyfumarate since after the initial loss of active oxygen no further loss occurred on prolonged stirring with a fresh quantity of diethyl ether.

Example 2.—The decomposition of di-*t*-butyl diperoxyfumarate in ethyl alcohol

A 0.1 molar solution of di-*t*-butyl diperoxyfumarate in ethanol was prepared by dissolving the required amount of fumarate ester in ethyl alcohol at −10° C. The solution was kept below 0° C. Ten ml. aliquots of the solution were sealed in tubes and placed in a constant temperature bath at 40°. Samples were removed periodically and assayed for "active oxygen" and for unreacted di-*t*-butyl diperoxyfumarate by thin layer chromatography. Within one hour of placing the tubes in the bath, all of the di-*t*-butyl diperoxyfumarate had disappeared even though there was very little loss of "active oxygen."

Thus it is evident that some reaction took place between ethanol and di-*t*-butyl diperoxyfumarate that did not involve the peroxidic oxygen atoms.

Example 3.—The preparation of di-t-butyl alpha-(2-tetrahydrofuryl)diperoxysuccinate A 200 ml. reaction kettle was fabricated having the following specifications: internal diameter 1.5 inches, internal height 7 inches and reactor completely enclosed in a glass jacket for the purpose of circulating a heat exchange liquid usually ice water. The reactor was equipped with a mechanically-operated paddle stirrer, a reflux condenser, thermometer, and an additional funnel. The reactor was irradiated by a Westinghouse 275 watt "sun lamp" situated about 10 inches from the outer wall of the reactor.

The reactor was charged with 150 ml. of tetrahydrofuran freshly distilled from lithium aluminum hydride. A saturated solution of 39 g. (0.15 mole) of di-*t*-butyl diperoxyfumarate in pentane was placed in the addition funnel. The funnel was covered with aluminum foil to prevent irradiation of the diperoxyfumarate solution. The air in the reactor was displaced by nitrogen. The sun lamp was turned on and dropwise addition of the fumarate solution was begun. The addition required five hours and there was an additional 30 minutes of stirring after addition was complete. The reaction temperature was maintained at 1–2° C. by circulating ice water through the reactor jacket.

The reaction mixture was then stripped on a rotating vacuum evaporator at 25° and 0.1 mm. pressure until there was no further weight loss.

The residual oil weighed 46.7 g. (94% of theory) and contained 8.94% "active oxygen." The theoretical "active oxygen" for di-*t*-butyl alpha-(2-tetrahydrofuryl)diperoxysuccinate is 9.64%. The assay based on "active oxygen" was therefore 92.8%.

A *duplicate run* made under identical conditions gave 47.2 g. (94.8% of theory) and an "active oxygen" content of 8.83% (91.6% of theory).

In order to establish the structure of the product, a 10 gram sample was dissolved in 50 ml. of absolute alcohol and subject to hydrogenolysis at 50 p.s.i.g. and 25° C. using a 1% platinum on charcoal catalyst in a Parr Hydrogenation Apparatus. Peroxyesters are readily reduced to the parent acid and the alcohol from which the peroxy portion of the ester was derived.

After no further hydrogen was absorbed, the ethanolic solution was filtered to remove the catalyst and the filtrate was stripped in vacuo on a rotating evaporator, leaving a solid residue weighing 4.2 g. The solid was triturated with benzene, filtered and dried twelve hours in a vacuum oven at 50° C. The solid melted at 128–33° C. on a Fisher-Johns melting point block. The neutralization equivalent was found to be 99.8. The theoretical value for alpha-(2-tetrahydrofuryl)succinic acid is 94.1.

Since this acid has not been disclosed in the literature, an authentic sample was prepared by the saponification of diethyl alpha-(2-tetrahydrofuryl)succinate which was prepared by the addition of tetrahydrofuran to diethyl maleate. The "authentic" acid after being recrystallized twice from a chloroform-cyclohexane solution melted at 128–130°. The free acid has a tendency to absorb moisture from the air. A carefully dried sample had a neutralization equivalent of 94.1 (theory 94.2). The infrared spectra of mineral oil mulls of the "authentic" acid and the acid obtained by hydrogenolysis of the perester were identical.

Example 4.—The preparation of di-*t*-butyl alpha-acetyldiperoxysuccinate

Into the reactor described in example 3 was charged 88 g. (2.0 moles) of acetaldehyde. The reactor was irradiated by the sun lamp. A saturated solution of 39.0 g. (0.15 mole) of di-*t*-butyldiperoxyfumarate in pentane was added over a 7 hour period to the stirred acetaldehyde while the reaction temperature was kept at 0°. After the addition was complete, the reaction mixture was stirred for 30 minutes.

The reaction mixture was stripped in vacuo of excess acetaldehyde on a rotating evaporator. The residue which weighed 66 g. was dissolved in 200 ml. of diethyl ether and was extracted six times with 100 ml. portions of water. The water washings were discarded and the ethereal solution was dried over magnesium sulfate. The drying agent was removed by filtration and the filtrate was stripped in vacuo on a rotating evaporator. The residue was a pale yellow oil, weighed 41.9 g. (92% of theory), and assayed 74.8% based on "active oxygen."

A drop of the yellow oil when added to a dilute aqueous ferric chloride solution showed the deep red color characteristic of beta-ketoesters. Neither acetaldehyde nor di-*t*-butyl diperoxyfumarate give this color.

A 10 g. portion of peroxide was subject to hydrogenolysis as described in example 3. A platinum oxide catalyst was used instead of platinum on charcoal when it was observed that addition of the platinum catalyst caused violent decomposition of the peroxide. This characteristic property was observed with all alpha-acyl-diperoxysuccinates that were prepared. Neither di-*t*-butyl diperoxyfumarate nor the adducts derived from substrates other than aldehydes were decomposed by platinum on charcoal.

Filtration and evaporation of the hydrogenolysis mixture left an oily liquid acid having the properties of levulinic acid. The expected hydrogenolysis product alpha-acetylsuccinic acid is unstable and rapidly loses carbon dioxide to give levulinic acid. Beta-keto-carboxylic acids are prone to decarboxylation.

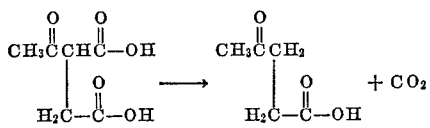

Example 5.—The preparation of di-*t*-butyl alpha-butyryldiperoxysuccinate

The reactor described in example 3 was charged with 150 ml. of freshly distilled n-butyraldehyde. The sun lamp was turned on and a pentane solution containing 39.0 g. (0.15 mole) di-*t*-butyl diperoxyfumarate was added over a 5.5 hour period to the butyraldehyde maintained at 0° C. Stirring was continued for two hours after completion of the addition.

The reaction mixture was stripped at room temperature on a rotating evaporator at an ultimate vacuum of 0.1 mm. The colorless residue weighed 51.9 g. (104% of theory) and assayed 87.2% based on active oxygen.

A 5 gram sample was hydrogenolyzed using a platinum oxide catalyst as described in Examples 3 and 4. After removal of the catalyst and solvent, there remained a low-melting colorless solid. Recrystallization from cyclohexane afforded 1 g. of shiny crystals melting at 47° and having a neutralization equivalent of 146.1. The theoretical neutralization equivalent of 4-oxoheptanoic acid is 144.2 and the reported melting point is 49–50, Wiley and Herrell, *J. Org. Chem.* 25, 903 (1960). Alpha-butyrylsuccinic acid spontaneously decarboxylates to 4-oxoheptanoic acid.

A 30 g. sample of the crude di-t-butyl alpha-butyryldiperoxysuccinate solidified on standing two weeks in a refrigerator. The solid was recrystallized from pentane at 0° C. The colorless crystalline product melts at 30° C. and assayed 96.0% based on "active oxygen."

Example 6.—The addition of diisopropyl ether to di-t-butyldiperoxy fumarate

The reactor described in Example 3 was charged with 102 g. (1.0 mole) of diisopropyl ether and was illuminated by a sun lamp. The ether was vigorously stirred under a nitrogen atmosphere while a pentane solution containing 26.0 g. (0.1 mole) of di-t-butyl diperoxyfumarate was added over a period of 6.5 hours. The reaction mixture was stirred for an additional hour. The temperature was kept at 0° to 2° during the reaction.

The excess diisopropyl ether and pentane were removed in vacuo on a rotating evaporator. The liquid residue weighed 31.0 (86% of theory) and assayed 83.9% based on "active oxygen."

Hydrogenolysis over a platinum on charcoal catalyst of 12 g. of the adduct gave a very hygroscopic solid dicarboxylic acid having a neutralization equivalent of 110.3. The acid was identified as 3-carboxy-4-methyl-4-isopropoxyvaleric acid (I) having a theoretical neutralization equivalent of 109.12.

The new peroxide therefore is t-butyl 3-(t-butylperoxy-carbonyl)-4-methyl - 4 - isopropoxyperoxyvalerate (II) arising from the addition of a molecule of diisopropyl ether across the double bond of di-*t*-butyl diperoxyfumarate.

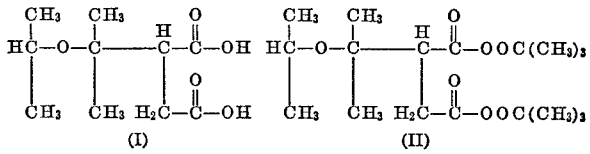

Example 7.—The addition of polyethylene glycol to di-t-butyl diperoxyfumarate

Into the reactor described in Example 3 was charged 100 g. of "Polyglycol E600," a product of the Dow Chemical Corporation consisting of a polyethylene glycol having a number average molecular weight of 600. The air in the reactor was displaced with nitrogen. The reactor was irradiated by a sun lamp while a pentane solution of 43.3 g. (0.167 mole) of di-t-butyl diperoxyfumarate was added over a 5.5 hour period. The reaction mixture was maintained at 24° C., the lowest temperature at which the mixture remained liquid. After a total reaction time of 7 hours, the mixture was transferred to an open top reactor and extracted twice with 100 ml. portions of pentane in order to remove any unreacted peroxyfumarate ester. The second extract contained no measurable "active oxygen."

The reaction mixture was stripped at an ultimate vacuum of 0.1 mm. on a rotating evaporator. The residue weighed 127.8 g. and contained, by iodometric titration, 2.99% "active oxygen." This corresponds to a 72% yield based on "active oxygen" content.

The structure of this product is shown below, where $m+n$ is 10 to 16.

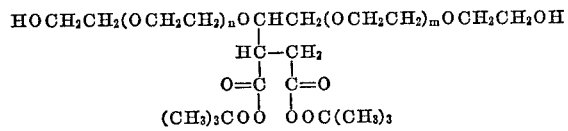

Example 8.—The addition of isopropyl alcohol to di-t-butyl diperoxyfumarate

A pentane solution of 39.0 g. (0.15 mole) of di-*t*-butyl diperoxyfumarate was added over a 6.5 hour period to 120 g. (2.0 mole) of isopropyl alcohol contained in the reactor described in Example 3. The reactor was illuminated by a sun lamp and kept at 0° during the addition and for a further 90 minutes of stirring.

A solid product began to separate from the reaction mixture toward the end of the reaction. The reaction mixture was concentrated in vacuo to one-half its volume and then kept at 0° for two hours during which a colorless solid crystallized. The product was separated by filtration, the filter cake washed with a little cold isopropyl alcohol and dried by passing air through the filter cake. The solid melted at 65–70° and weighed 12 g. Additional product was isolated by concentrating the mother liquors.

The isopropyl alcohol mother liquors contained *t*-butyl hydroperoxide indicating that some transesterification had occurred during the reaction as shown in equation.

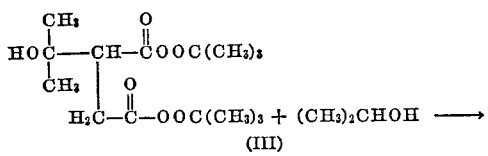

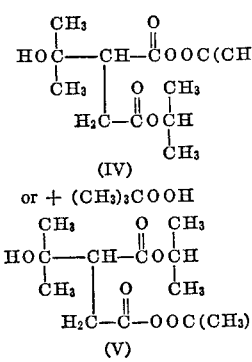

The solid product assayed 80.7% based on "active oxygen" analysis. Recrystallization of the product from benzene-cyclohexane failed to improve the assay indicating that byproducts IV and/or V co-crystallized along with III.

In order to establish that the structure of the product was III, 6 g. of the solid product was treated with hydrogen and a platinum catalyst as described in previous examples. The hydrogenolysis product was recrystallized from ethanol, melted at 174–176° and was identified as beta-carboxy-gamma-methyl-gamma-valerolactone formed by spontaneous lactonization of the diacid as shown in equation.

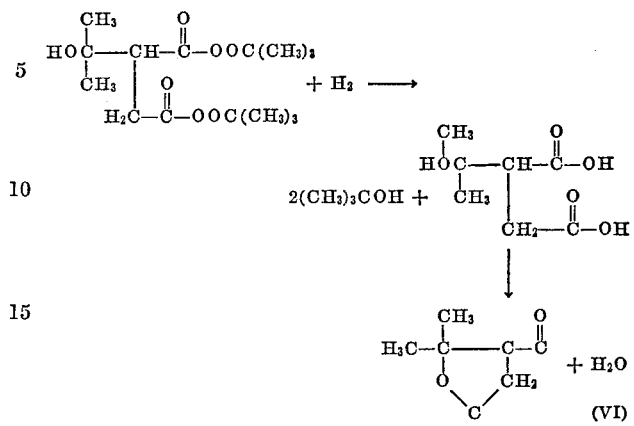

The neutralization equivalent for VI was found to be 162 (theoretical value is 158). A portion of VI was carefully saponified with warm aqueous sodium hydroxide and the excess base was back-titrated with 0.1 N acid using a pH meter to determine the end point. The saponification equivalent (after correction for the free carboxylic acid) was found to be 168 (theory for VI is 158).

Example 9.—The preparation of di-t-butyl alpha-pivaloyldiperoxysuccinate

The title compound was prepared by adding a pentane solution of 39 g. (0.15 mole) of di-t-butyl diperoxyfumarate to 100 g. (1.16 mole) of pivalaldehyde (trimethylacetaldehyde) under conditions equivalent to those described in example 5. From the vacuum-stripped crude reaction mixture was isolated 16.9 g. of crystalline di-*t*-butyl alpha-pivaloyldiperoxysuccinate (VII) melting at 65° and assaying 103% based on the "active oxygen" content. Additional product of slightly lower assay (95%) was isolated from the mother liquors.

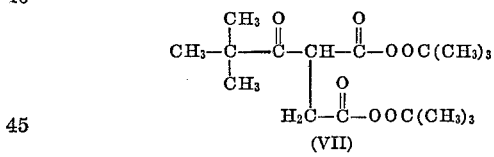

Example 10.—The preparation of di-*t*-butyl alpha-(methoxycarbonyl)diperoxysuccinate A pentane solution of 39.0 g. (0.15 mole) of di-*t* butyl diperoxyfumarate was added over a six hour period to 100 ml. of methyl formate contained in the reactor described in example 3. The reactor was illuminated by a sun lamp and kept at 0–5° C. during the addition and for a further 90 minutes of stirring.

The reaction mixture was stripped on a rotating evaporator to an ultimate vacuum of 3 mm. in order to remove the pentane and unreacted methyl formate. The residue weighed 38.8 g. (81% of theory) and assayed 100% based on "active oxygen" determination.

An 8 g. sample was hydrogenolyzed using a platinum on charcoal catalyst. Work-up of the reaction mixture yielded an oily solid which was purified by precipitating it from acetone by the addition of pentane. The neutralization equivalent of the solid was 69 (theory for VIII is 88; theory for IX is 54). Therefore, the hydrogenolysis product is probably a mixture of VIII and IX.

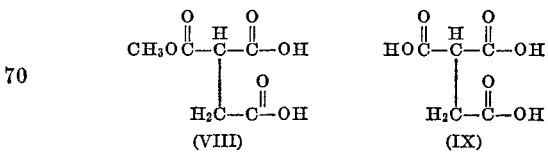

One g. of the hydrogenolysis product was heated on a steam bath for 1 hour with 15 ml. of water containing 2 drops of concentrated hydrochloric acid until the mixture was completely homogeneous. The yellow solution was evaporated to dryness leaving a semicrystalline solid. This solid was dissolved in ethyl acetate and reprecipitated by the addition of ether. The colorless crystalline solid was removed by filtration, washed with a little ether and air-dried. The solid melted with decomposition at 177–178°. The melting point reported for 1,1,2-ethanetricarboxylic acid (IX) is 178°, Bull. Soc. Chem. France, 1943 (1959).

The peroxidic product is therefore di-$t$-butyl alpha-(methoxycarbonyl)diperoxysuccinate (X).

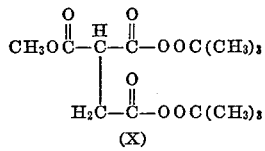

(X)

Example 11.—The addition of methyl isopropyl ketone to di-$t$-butyl diperoxyfumarate A pentane solution of 39.0 g. (0.15 mole) of di-$t$-butyl diperoxyfumarate was added over a 4 hour period to 129 g. (1.5 moles) of methyl isopropyl ketone contained in the reactor described in example 3. The reactor was illuminated by a sun lamp and kept at 0° C. during the addition and for a further 3 hours of stirring.

The reaction mixture was then stripped at an ultimate vacuum of 0.1 mm. on a rotating evaporator leaving 45.2 g. (86.5% of theory) of a pale yellow liquid containing 9.11% "active oxygen" (theory for (XI) 9.24%). Assay was therefore 98.7%.

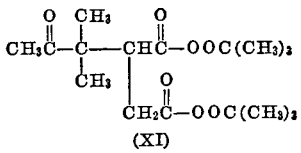

(XI)

Example 12.—The addition of isobutyric acid to di-$t$-butyl diperoxyfumarate

A pentane solution of 39.0 g. (0.15 mole) of di-$t$-butyl diperoxyfumarate was added over a 7 hour period to 132 g. (1.5 moles) of isobutyric acid contained in the reactor described in example 3. The reactor was illuminated by a sun lamp and kept at 0° C. during the addition and for a further 15 minutes of stirring.

The reaction mixture was stirred into 800 ml. of ice water. The organic layer was separated and washed 4 times with 500 ml. portions of water. The organic layer was diluted with an equal volume of ether and dried over sodium sulfate. The solution, filtered free of drying agent, was stripped in vacuo on a rotating evaporator to a weight of 64 g. Since the theoretical yield was 52.3 g., there was still unreacted isobutyric acid in the product. The water extraction procedure was repeated and the product after drying and stripping weighed 37.7 g. (72% of theory) and assayed 80.3% based on "active oxygen" content. The structure of the product is shown below (XII).

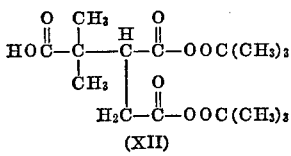

(XII)

Example 13.—The addition of trimethyl orthoformate to di-$t$-butyl diperoxyfumarate A pentane solution of 39 g. (0.15 mole) of di-t-butyl diperoxyfumarate was added over a 5.5 hour period to 106 g. (1.0 mole) of trimethyl orthoformate contained in the reactor described in example 3. The reactor was illuminated by a sun lamp and kept at 0°–5° C. during the addition and for a further 1¼ hours of stirring.

The reaction mixture was stripped at an ultimate vacuum of 1 mm. using a rotating evaporator leaving a viscous yellow oil weighing 36.3 g. (66% of theory) and assaying 84.2% based on active oxygen content. The structure of the product is shown below (XIII).

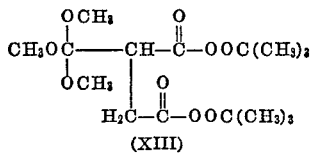

(XIII)

Example 14.—Preparation of a polyethylene glycol-polystyrene graft copolymer

The polyethylene glycol-di-$t$-butyl diperoxy fumarate adduct described in example 7 was used to initiate styrene polymerization at 100° C.

At an initiator concentration of $5 \times 10^{-4}$ active oxygen equivalents per deciliter of styrene the rate of initiation was $9.66 \times 10^{-3}$ mole/liter/min. as determined by dilatometry.

The resultant polymer was a mixture of polystyrene homopolymer and a polyethylene glycol-polystyrene graft copolymer with the probable structure (XIV) shown below where m+n=10 to 16, x and y are from 10 to 500.

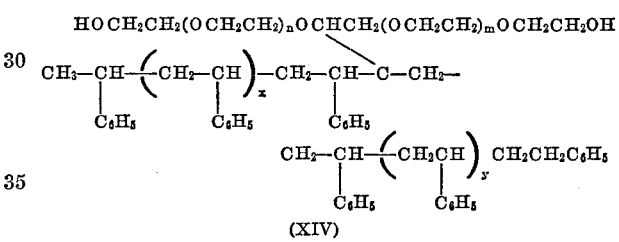

(XIV)

The polystyrene homopolymer was removed by extraction with benzene in which the graft copolymer is insoluble.

EXAMPLE 15

In order to demonstrate the capability of this process to "tailor-make" peroxides of a desired decomposition rate, the half-lives of several of the peroxides, described in the preceding examples, were determined. Dilute benzene solution, usually 0.1 molar, of the peroxides were prepared, aliquots were sealed into glass tubes and the glass tubes were immersed in constant temperature baths. Samples were periodically withdrawn and were assayed for "active oxygen" content by standard analytical methods. All the peroxides tested followed first order demomposition kinetics. The half-lives are listed in Table (15).

TABLE (15)
Selected half-lives of peroxides

| Sample | | Temp. (° C.) | $t_{1/2}$ (hrs.) |
| --- | --- | --- | --- |
| A | Di-$t$-butyl diperoxyfumarate | 85 | 5.5 |
|  | do | 100 | 1.5 |
| B | Di-$t$-butyl alpha-(2-tetrahydrofuryl) diperoxysuccinate. | 85 | 30.1 |
| C | Di-$t$-butyl alpha-butyrylidiperoxysuccinate. | 85 | 51.7 |
|  | do | 100 | 9.6 |
| D | Di-$t$-butyl alpha-pivaloyldiperoxysuccinate. | 85 | 19.0 |
| E | Di-$t$-butyl diperoxyfumaratepolyethylene glycol adduct. | 100 | 5.5 |
| F | $t$-Butyl 3-($t$-butylperoxycarbonyl)-4-methyl-4-isopropoxyperoxyvalerate. | 85 | 26.6 |

EXAMPLE 16

Rates of polymerization of styrene were determined by dilatometry using the peroxides listed in Table (15) as initiators. The concentration of initiator was $5 \times 10^{-4}$ active oxygen equivalent per deciliter of styrene. The results are listed in Table (16).

TABLE (16)
Peroxide-initiated polymerization of styrene

| Peroxide sample | Polymerization temperature, degree | Rate of polymerization after 5% conversion, moles/liter/minute |
|---|---|---|
| B | 85 | $4.51 \times 10^{-3}$ |
| C | 100 | $9.55 \times 10^{-3}$ |
| E | 100 | $9.66 \times 10^{-3}$ |
| F | 85 | $5.34 \times 10^{-3}$ |

Example 17.—The heterogeneous addition reaction of a polyvinyl ether and di-$t$-butyl diperoxyfumarate A slurry of 17 parts by a weight of "Gantrex" resin (a copolymer of methyl vinyl ether and maleic anhydride, a product of the General Aniline and Film Corporation), 17 parts di-$t$-butyl diperoxyfumarate and 66 parts of benzene was stirred for 7 hours at 23° while being irradiated with a sun lamp.

The slurry was filtered and the solids were washed well with benzene to remove any unreacted di-$t$-butyl diperoxyfumarate. The solid polymeric product was found to contain 0.09% active oxygen corresponding to an adduct containing 1.9 g. of di-$t$-butyl diperoxy fumarate and 98.1% g. of Gantrez resin. A control run in which no diperoxyfumarate was added contained no detectable active oxygen.

In another run, a slurry of 88.2 parts hexane, 9.8 parts "Gantrez" resin and 2.0 parts of di-$t$-butyl diperoxyfumarate was used, a polymeric product was isolated containing 0.11% active oxygen.

We believe the product to be formed by a free radical addition involving the carbon-hydrogen bonds adjacent to the ether oxygens in the resin to give structure XV shown below.

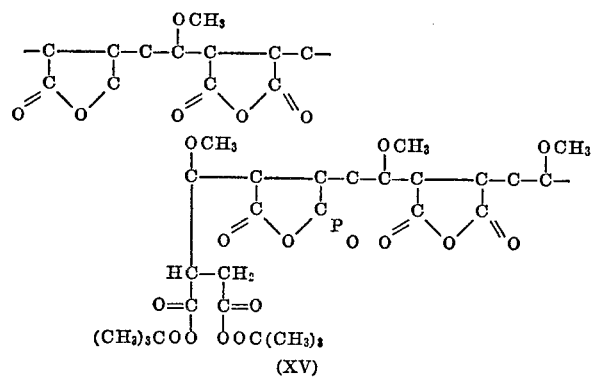

(XV)

Example 18.—The homogeneous addition reaction of a polyvinyl ether or polyvinyl acetate and di-$t$-butyl diperoxyfumarate (a) A solution of 92 parts of acetone, 6.6 parts of "Gantrez" resin and 1.4 parts of di-$t$-butyl diperoxy fumarate was stirred for 5 hours at 23° while being irradiated with a sun lamp.

The product was precipitated by pouring the acetone solution into an excess of hexane. The precipitated polymer was separated by filtration. The polymer was purified by dissolving it in acetone and reprecipitating it from hexane. After two precipitations, the polymer was analyzed for "active oxygen." The polymer contained 0.16% "active oxygen." The polymer from a control run contained no detectable "active oxygen."

(b) A similar reaction was carried out with polyvinyl acetate instead of "Gantrez" resin. The resultant polymer was found to contain 0.11% "active oxygen." One of the structures (XVI) of the polymeric product is shown below.

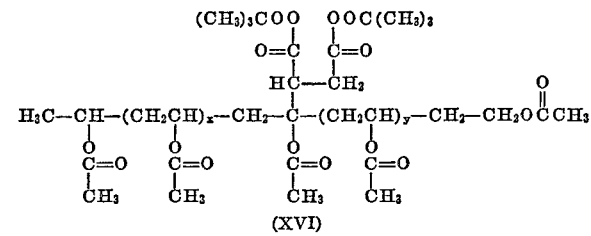

(XVI)

Example 19.—Addition of N,N-dimethylformamide to di-$t$-butyl diperoxyfumarate

A pentane solution of the diperoxyfumarate was added over a five hour period to N,N-dimethyl formamide, the reaction zone was maintained at 0° C. The reaction product mixture was diluted with water and the addition product extracted with benzene; the extract was dried over magnesium sulfate and stripped in vacuo. The product was an amber oil which is very unstable at room temperature. The product has the structure:

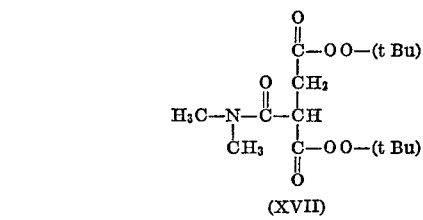

(XVII)

Thus having described the invention, what is claimed is:

1. A process for preparing a substituted diperoxy succinic acid diester of the formula

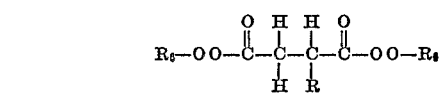

which process comprises saturating the double bond of a diester of diperoxyfumaric acid of the formula

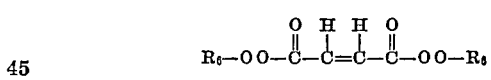

at a temperature of from about $-20°$ C. to $+30°$ C. by means of the addition of an organic compound, RH, having a readily extractable hydrogen atom, where:

$R_6$ is tertiary alkyl, tertiary cycloalkyl or tertiary aralkyl having up to about 12 carbons;

R is $R_2OC(R_3)_2$— or $(R_2O)_3C$—;

$R_2$ is selected from alkyl, cycloalkyl, aralkyl or aryl having up to about 12 carbons, and a divalent radical which joins with —$OCR_3$— to form tetrahydrofuryl or tetrahydropyranyl; and the $R_3$ groups are selected from alkyl, cycloalkyl, aryl or aralkyl having up to 12 carbons, hydrogen, and a divalent radical which joins with —$R_2OC$— to form tetrahydrofuryl or tetrahydropyranyl or with each other and the connecting carbon atom to form cyclopentyl or cyclohexyl.

2. The process of claim 1 wherein the reaction mixture is subjected to ultraviolet radiation.

3. The process of claim 1 where $R_6$ is tertiary butyl.

4. The process of claim 3 wherein RH is diethyl ether.

5. The process of claim 3 where RH is diisopropyl ether.

6. The process of claim 3 where RH is tetrahydrofuran.

7. The process of claim 3 where RH is trimethyl orthoformate.

8. A compound of the formula:

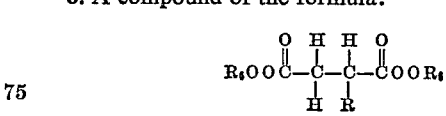

where:

$R_6$ is tertiary alkyl having 4–12 carbons;
R is $R_2OC(R_3)_2$— or $(R_2O)_3C$—;
$R_2$ is alkyl having 1–12 carbons; and
$R_3$ is hydrogen or alkyl having 1–12 carbons.

9. The compound of claim 3 where $R_6$ is tertiary butyl.

10. The compound of claim 9 where R is $C_2H_5OCH(CH_3)$—.

11. The compound of claim 9 where R is $CH(CH_3)_2$—O—$C(CH_3)_2$—.

12. The compound of claim 9 where R is $(CH_3O)_3C$—.

13. A compound of the formula:

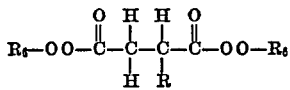

where:

$R_6$ is tertiary alkyl having 4–12 carbons;
R is $R_2OC(R_3)_2$— or $(R_2O)_3C$—;
$R_2$ is alkyl having 1–12 carbons or a divalent radical which joins with —$OCR_3$— to form tetrahydrofuryl; and
$R_3$ is hydrogen, alkyl having 1–12 carbons or a divalent radical which joins with —$R_2OC$— to form tetrahydrofuryl.

14. Di-*t*-butyl alpha-(2-tetrahydrofuryl)diperoxysuccinate.

References Cited

Jacobs et al., J. Org. Chem. (1963), vol. 28 (11), pp. 3036–8.

C. A 6, 13501e (1969), vol. 71, abstract of Neth. Appl. 67 11,825, Mar. 4, 1969, whose date is relied on.

HENRY R. JILES, Primary Examiner

B. DENTZ, Assistant Examiner

U.S. Cl. X.R.

260—345.8, 453; 204—158 R

UNITED STATES PATENT OFFICE
CERTIFICATE OF CORRECTION

Patent No. 3,816,476          Dated June 11, 1974

Inventor(s) Richard Anthony Bafford, Ernest Rudolph Kamens and
Orville Leonard Mageli It is certified that error appears in the above-identified patent and that said Letters Patent are hereby corrected as shown below:

Column 1, line 8, after "Kenmore, N.Y. 14217," there should be inserted -- assignors to Pennwalt Corporation, Philadelphia, Pa. --

Column 8, between lines 5 and 6, there should be inserted -- "active oxygen" content of pure di-t-butyl diperoxy - --.

Column 15, at lines 40-45, the left-hand portion of the formula reading

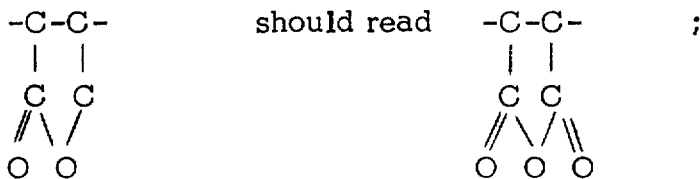

and at lines 45-50, that portion of the formula reading

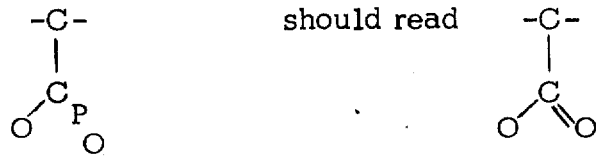

Column 17, line 6, "Claim 3" should be corrected to read -- Claim 8 --.

Signed and sealed this 29th day of October 1974.

(SEAL)
Attest:

McCOY M. GIBSON JR.          C. MARSHALL DANN
Attesting Officer          Commissioner of Patents